US009764705B2

(12) United States Patent
Murata et al.

(10) Patent No.: US 9,764,705 B2
(45) Date of Patent: Sep. 19, 2017

(54) VEHICLE CONNECTING MEMBER AND VEHICLE FRONT SECTION STRUCTURE

(71) Applicant: TOYOTA JIDOSHA KABUSHIKI KAISHA, Toyota-shi (JP)

(72) Inventors: Soshiro Murata, Toyota (JP); Hiroyuki Koike, Toyota (JP); Yasuhide Matsuo, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/922,612

(22) Filed: Oct. 26, 2015

(65) Prior Publication Data

US 2016/0121829 A1 May 5, 2016

(30) Foreign Application Priority Data

Oct. 29, 2014 (JP) ................. 2014-220480

(51) Int. Cl.
  *B60R 19/34* (2006.01)
  *B62D 25/08* (2006.01)
  *B60R 19/24* (2006.01)

(52) U.S. Cl.
  CPC .............. *B60R 19/34* (2013.01); *B62D 25/08* (2013.01); *B60R 2019/247* (2013.01)

(58) Field of Classification Search
  CPC .... B60R 19/34; B60R 2019/247; B62D 25/08
  See application file for complete search history.

(56) References Cited

U.S. PATENT DOCUMENTS 9,422,007 B2 * 8/2016 Suzuki ................ B62D 21/152
2005/0077711 A1 4/2005 Yasui et al.

FOREIGN PATENT DOCUMENTS

| JP | 5-305878 A | 11/1993 |
| JP | 3974567 | 9/2007 |
| JP | 2014-12428 | 1/2014 |
| JP | 2014-125172 A | 7/2014 |
| WO | WO 2014/115579 A1 | 7/2014 |

* cited by examiner

*Primary Examiner* — Glenn Dayoan
*Assistant Examiner* — Melissa A Black
(74) *Attorney, Agent, or Firm* — Oblon, McClelland, Maier & Neustadt, L.L.P.

(57) ABSTRACT

There is provided a vehicle connecting member including: a front face portion that is connected to a crash box; a first connecting section inserted with and connected to a front end portion of a side member provided running along a vehicle front-rear direction at the vehicle front-rear direction rear side of the crash box; a second connecting section that is formed at a vehicle width direction outside of the first connecting section in a vehicle plan view, and that is connected to a lower end portion of an outrigger provided running along the vehicle front-rear direction at the vehicle width direction outside of the side member so as to extend toward a vehicle vertical direction lower side; and one or more lateral ribs that couple together the first connecting section and the second connecting section.

8 Claims, 8 Drawing Sheets

VEHICLE CONNECTING MEMBER AND VEHICLE FRONT SECTION STRUCTURE

CROSS-REFERENCE TO RELATED APPLICATION

This application claims priority under 35 USC 119 from Japanese Patent application No. 2014-220480 filed on Oct. 29, 2014, the disclosure of which is incorporated by reference herein.

BACKGROUND

Technical Field

The present disclosure relates to a vehicle connecting member and a vehicle front section structure.

Related Art

Japanese Patent No. 0003974567 describes a front section vehicle body structure of an automobile in which a front side frame extends along the front-rear direction of a vehicle body, a front pillar is provided at the upper rear side of the front side frame, an upper member extends from a lower end portion of the front pillar toward the front, and the upper member is disposed at the outside of the front side frame. In this related art, an extension member (extension) extends from a front end portion of the front side frame toward the vehicle body front. Further, a front end portion of the upper member is coupled to an end portion of a bumper beam through a coupling member and the front side frame.

Japanese Patent Application Laid-Open (JP-A) No. 2014-012428 describes a vehicle body front section structure in which at least a portion of a coupling member, which couples together an apron member and a front side member in the vehicle width direction, is disposed at the vehicle width direction outside of a supporting member for supporting both vehicle width direction sides of a power unit in plan view.

In such cases, it is desirable to efficiently distribute and transmit collision load input from the vehicle front-rear direction front side to the side member and an outrigger (apron member).

SUMMARY

In consideration of the above circumstances, the present disclosure provides a vehicle connecting member and a vehicle front section structure capable of efficiently distributing and transmitting collision load to a side member and an outrigger.

A first aspect of the present disclosure is a vehicle connecting member including: a front face portion that is connected to a crash box; a first connecting section inserted with and connected to a front end portion of a side member provided running along a vehicle front-rear direction at the vehicle front-rear direction rear side of the crash box; a second connecting section that is formed at a vehicle width direction outside of the first connecting section in a vehicle plan view, and that is connected to a lower end portion of an outrigger provided running along the vehicle front-rear direction at the vehicle width direction outside of the side member so as to extend toward a vehicle vertical direction lower side; and one or more lateral ribs that couple together the first connecting section and the second connecting section.

In the vehicle connecting member of the first aspect, collision load transmitted to the crash box is input to the front face portion of the vehicle connecting member. Load input to the front face portion of the vehicle connecting member is distributed and transmitted to the front end portion of the side member that is inserted through and connected to the first connecting section, and the lower end portion of the outrigger that is connected to the second connecting section.

In a case in which this occurs, collision load is transmitted to the vehicle width direction outside, and transmitted to the lower end portion of the outrigger connected to the second connecting section, by the one or more lateral ribs coupling the first connecting section and the second connecting section. Collision load is thereby efficiently distributed and transmitted to the side member and the outrigger.

A second aspect of the present disclosure is the vehicle connecting member of the first aspect, wherein the second connecting section configures a gripping structure that grips onto the lower end portion of the outrigger from the vehicle width direction inside.

In the vehicle connecting member of the second aspect, the second connecting section grips onto and connects with the lower end portion of the outrigger from the vehicle width direction inside, thereby improving connection strength. Collision load is thereby efficiently transmitted to the outrigger.

A third aspect of the present disclosure is the vehicle connecting member of the first aspect or the second aspect, further including a third connecting section that is formed at the vehicle vertical direction lower side of the first connecting section in a vehicle rear view and that has a lower portion bolt-fastened to a suspension member, wherein one or more upright ribs are formed at the third connecting section so as to couple the lower portion and the first connecting section.

In the vehicle connecting member of the third aspect, load input to the front face portion of the vehicle connecting member is distributed and transmitted to the suspension member bolt-fastened to the lower portion of the third connecting section formed at the vehicle vertical direction lower side of the first connecting section.

In a case in which this occurs, collision load is transmitted to the vehicle vertical direction lower side and transmitted to the suspension member, by the one or more upright ribs coupling the lower portion bolt-fastened to the suspension member and the first connecting section. Collision load is thereby efficiently distributed and transmitted to the side member, the outrigger, and the suspension member.

A fourth aspect of the present disclosure is the vehicle connecting member of the third aspect, wherein one or more lateral ribs are formed at the third connecting section.

In the vehicle connecting member of the fourth aspect, the rigidity at a force application point of the suspension member is increased by the one or more lateral ribs formed at the third connecting section.

A fifth aspect of the present disclosure is the vehicle connecting member of the third aspect or the fourth aspect, wherein at least one of the upright ribs of the third connecting section configures a boss into which a bolt is screwed.

In the vehicle connecting member of the fifth aspect, collision load is transmitted to the vehicle vertical direction lower side and efficiently transmitted to the suspension member by the boss. Moreover, the rigidity at the force application point of the suspension member is improved.

A sixth aspect of the present disclosure is a vehicle front section structure including: the vehicle connecting member described in the first aspect or the second aspect; a crash box that is provided at a vehicle front section and that is connected to the front face portion of the vehicle connecting member; a side member that is provided running along the vehicle front-rear direction at the vehicle front-rear direction rear side of the crash box, and that has a front end portion inserted into and connected to the first connecting section of the vehicle connecting member; and an outrigger that is provided running along the vehicle front-rear direction at the vehicle width direction outside of the side member, and that has a lower end portion extending toward the vehicle vertical direction lower side connected to the second connecting section of the vehicle connecting member.

In the vehicle front section structure of the sixth aspect, the crash box, the side member, and the outrigger are connected together by the vehicle connecting member, such that the number of components is reduced. Thus the number of components is reduced, and collision load is efficiently distributed and transmitted to the side member and the outrigger.

A seventh aspect of the present disclosure is a vehicle front section structure including: the vehicle connecting member of any one of the third aspect to the fifth aspect; a crash box that is provided at a vehicle front section and that is connected to the front face portion of the vehicle connecting member; a side member that is provided running along the vehicle front-rear direction at the vehicle front-rear direction rear side of the crash box, and that has a front end portion inserted into and connected to the first connecting section of the vehicle connecting member; and an outrigger that is provided running along the vehicle front-rear direction at the vehicle width direction outside of the side member, and that has a lower end portion extending toward the vehicle vertical direction lower side connected to the second connecting section of the vehicle connecting member; and the suspension member that is bolt-fastened to the lower portion of the third connecting section of the vehicle connecting member.

In the vehicle front section structure of the seventh aspect, the crash box, the side member, the outrigger, and the suspension member are connected together by the vehicle connecting member, such that the number of components is reduced. Thus the number of components is reduced, and collision load is efficiently distributed and transmitted to the side member, the outrigger, and the suspension member.

The first aspect enables collision load to be efficiently distributed and transmitted to the side member and the outrigger.

The second aspect enables collision load to be more efficiently transmitted to the outrigger.

The third aspect enables collision load to be efficiently distributed and transmitted to the side member, the outrigger, and the suspension member.

The fourth aspect enables the rigidity at the force application point of the suspension member to be improved.

The fifth aspect enables collision load to be more efficiently transmitted to the suspension member, and the rigidity at the force application point of the suspension member to be improved.

The sixth aspect enables the number of components to be reduced, and collision load to be efficiently distributed and transmitted to the side member and the outrigger.

The seventh aspect enables the number of components to be reduced, and collision load to be efficiently distributed and transmitted to the side member, the outrigger, and the suspension member.

BRIEF DESCRIPTION OF THE DRAWINGS

Exemplary embodiments of the present disclosure will be described in detail based on the following figures, wherein.

DETAILED DESCRIPTION

Explanation follows regarding joint reinforcement (a vehicle connecting member) and a vehicle front section structure according to an exemplary embodiment of the present disclosure, with reference to FIG. 1 to FIG. 8. Note that in each of the drawings, the arrow FR indicates the vehicle front-rear direction front side, the arrow UP indicates the vehicle vertical direction upper side, and the arrow OUT indicates the vehicle width direction outside. The vehicle front section is fundamentally configured with left-right symmetry, and so illustration and explanation are of the vehicle right side.

Figure 1:
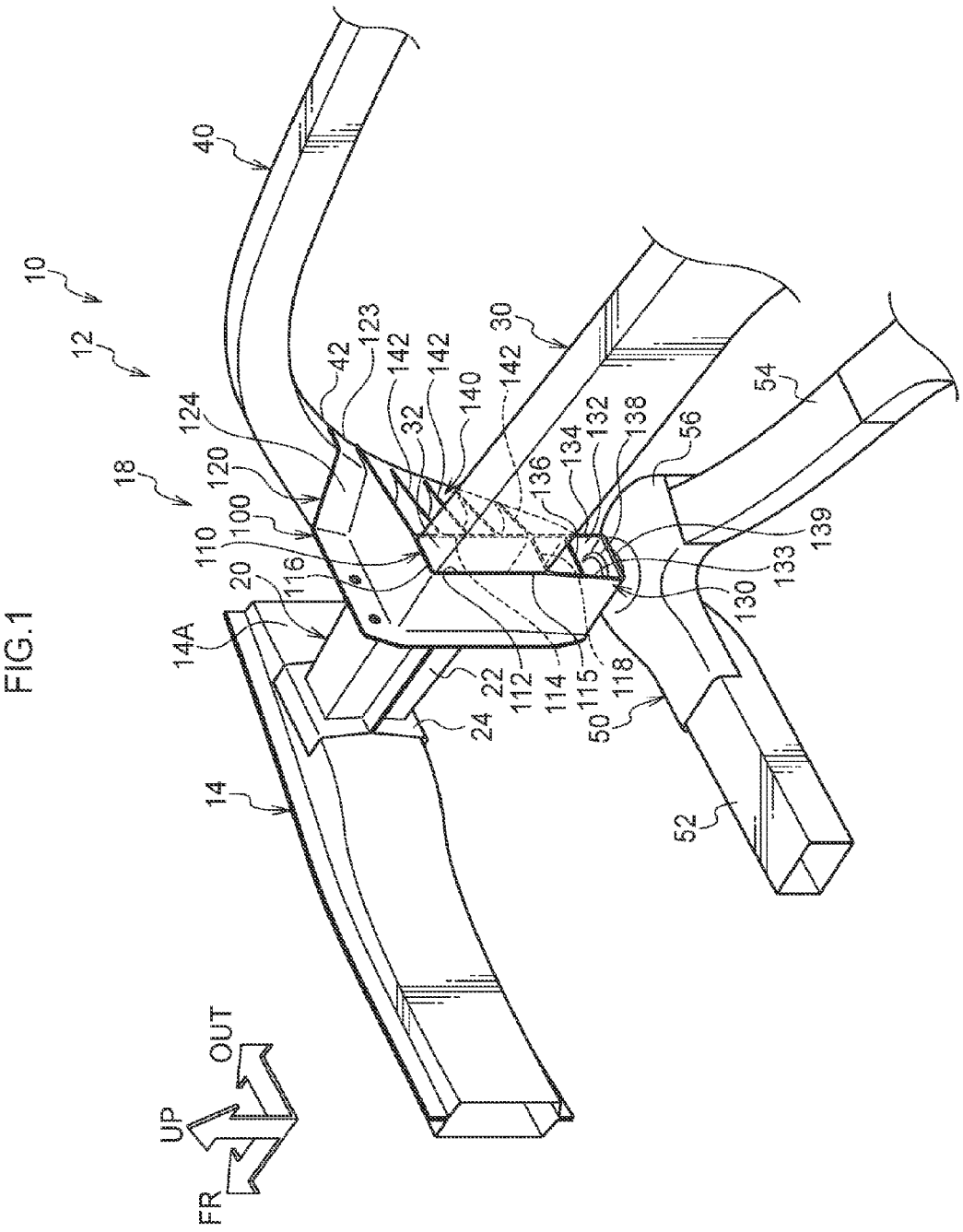
FIG. 1 is a perspective view illustrating a front section of a vehicle applied with a vehicle front section structure according to an exemplary embodiment of the present disclosure, viewed diagonally from the rear side from the vehicle width direction inside.
Figure 2:
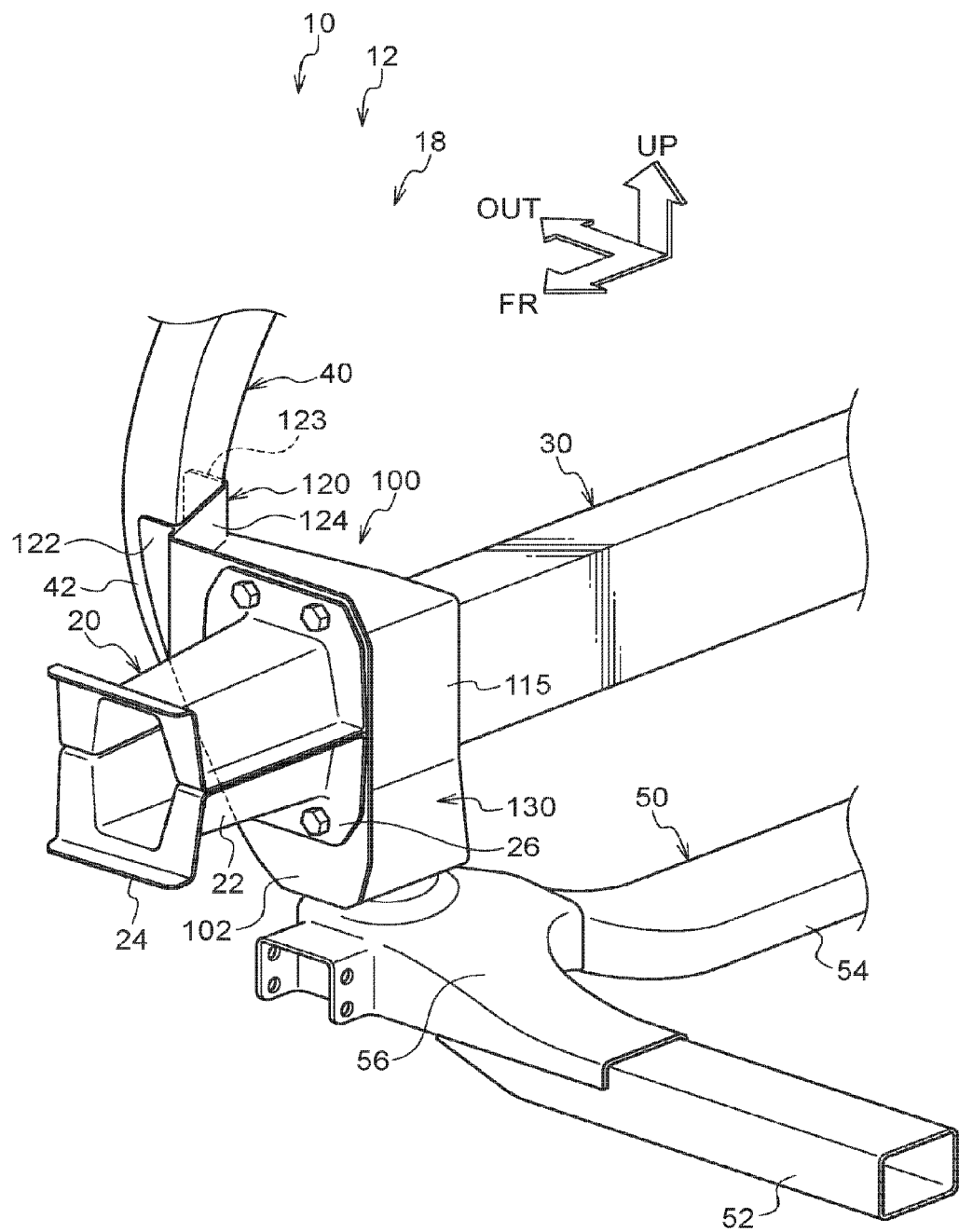
FIG. 2 is a perspective view illustrating a front section of a vehicle applied with a vehicle front section structure according to an exemplary embodiment of the present disclosure, viewed diagonally from the front side from the vehicle width direction inside.

FIG. 1 and FIG. 2 illustrate a front section 12 of a vehicle 10 applied with a vehicle front section structure 18. Both vehicle width direction side sections of the front section 12 of the vehicle 10 include joint reinforcement 100, serving as an example of a vehicle connecting member. A crash box 20, a side member 30, an outrigger (apron member) 40, and a suspension member 50 are connected to the joint reinforcement 100.

Figure 3:
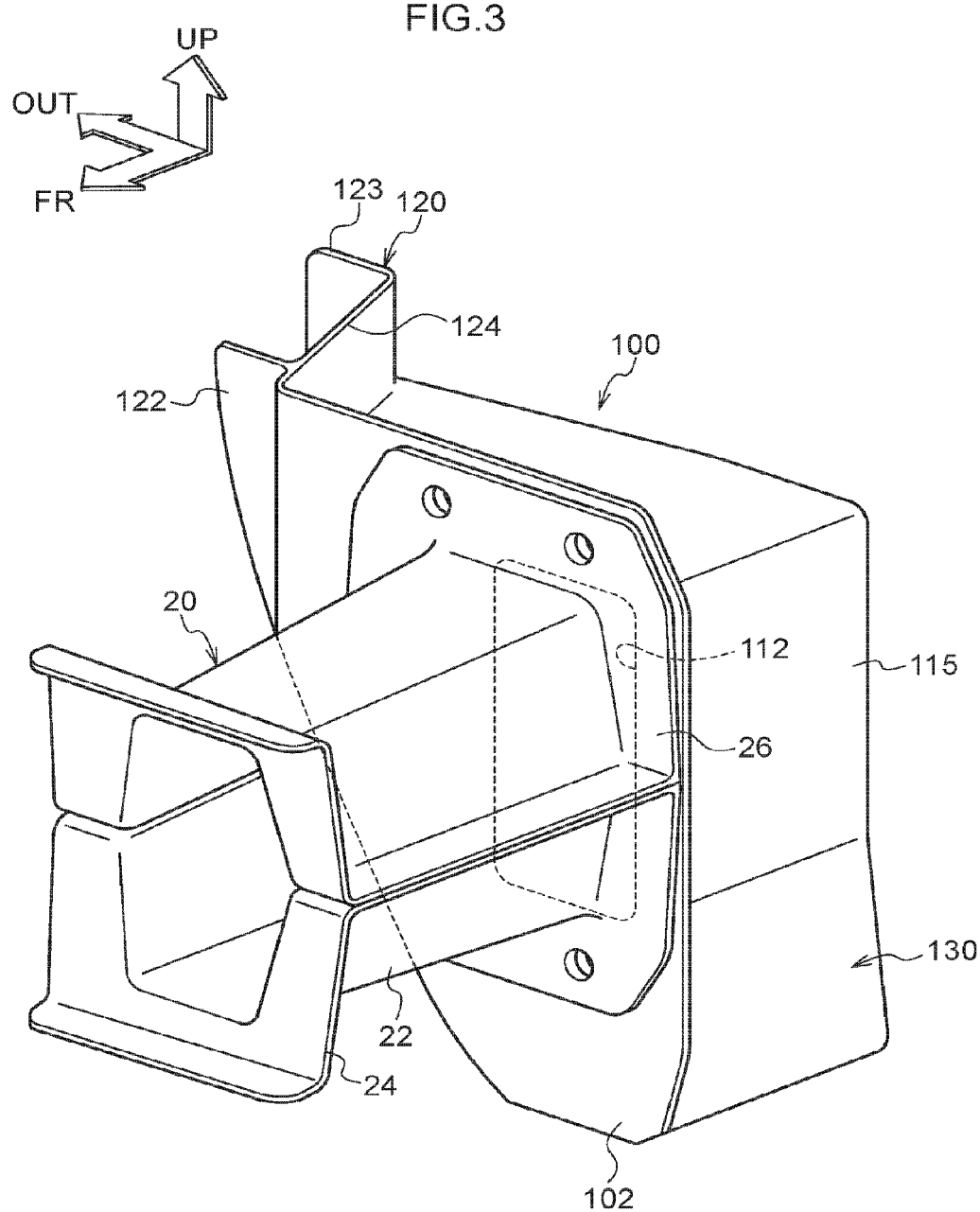
FIG. 3 is a perspective view illustrating a joint location between joint reinforcement and a crash box according to an exemplary embodiment of the present disclosure.

The joint reinforcement 100 is formed in an inverted, substantially trapezoidal shape in vehicle rear view and vehicle front view, and is made of die-cast aluminum with thickness along the vehicle front-rear direction. As illustrated in FIG. 3, a front face portion 102 of the joint reinforcement 100, excluding an open portion of a through-hole 112 of a first connecting section 110, described later, is configured with a planar face.

As illustrated in FIG. 1, bumper reinforcement 14, disposed with its length direction along the vehicle width direction, is provided at a front end section of the vehicle 10. An absorber (shock-absorbing member), not illustrated in the drawings, formed of a foamed body or the like, is attached to a front face of the bumper reinforcement 14, and the absorber and the bumper reinforcement 14 are covered by a bumper cover, not illustrated in the drawings. The crash boxes 20 are provided at rear sides of both vehicle width direction end portions of the bumper reinforcement 14.

As illustrated in FIG. 2 and FIG. 3, each crash box 20 of the present exemplary embodiment is a structure including a main body 22 with a closed cross-section structure, and flanges 24, 26 formed at a front end portion and a rear end portion of the main body 22. As illustrated in FIG. 1, the flanges 24 at the front end portions of the crash boxes 20 are joined to a rear face portion 14A at both vehicle width direction end portions of the above-mentioned bumper reinforcement 14.

As illustrated in FIG. 2 and FIG. 3, the flange 26 at the rear end portion of each crash box 20 is bolt-fastened to an outer edge portion of the through-hole 112 of the first connecting section 110, described below, at the front face portion 102 of the joint reinforcement 100 previously described.

As illustrated in FIG. 1, FIG. 4, FIG. 5, and FIG. 6, the first connecting section 110 is formed at an upper portion at the vehicle width direction inside of the joint reinforcement 100 in vehicle rear view. The first connecting section 110 is formed with the substantially rectangular shaped through-hole 112 piercing through in the vehicle front-rear direction. The through-hole 112 (first connecting section 110) is configured with upright wall portions 114, 115 configuring both vehicle width direction side walls, an upper wall portion 116 configuring a vehicle vertical direction upper side wall, and an intermediate wall portion 118 configuring a lower side wall.

Figure 4:
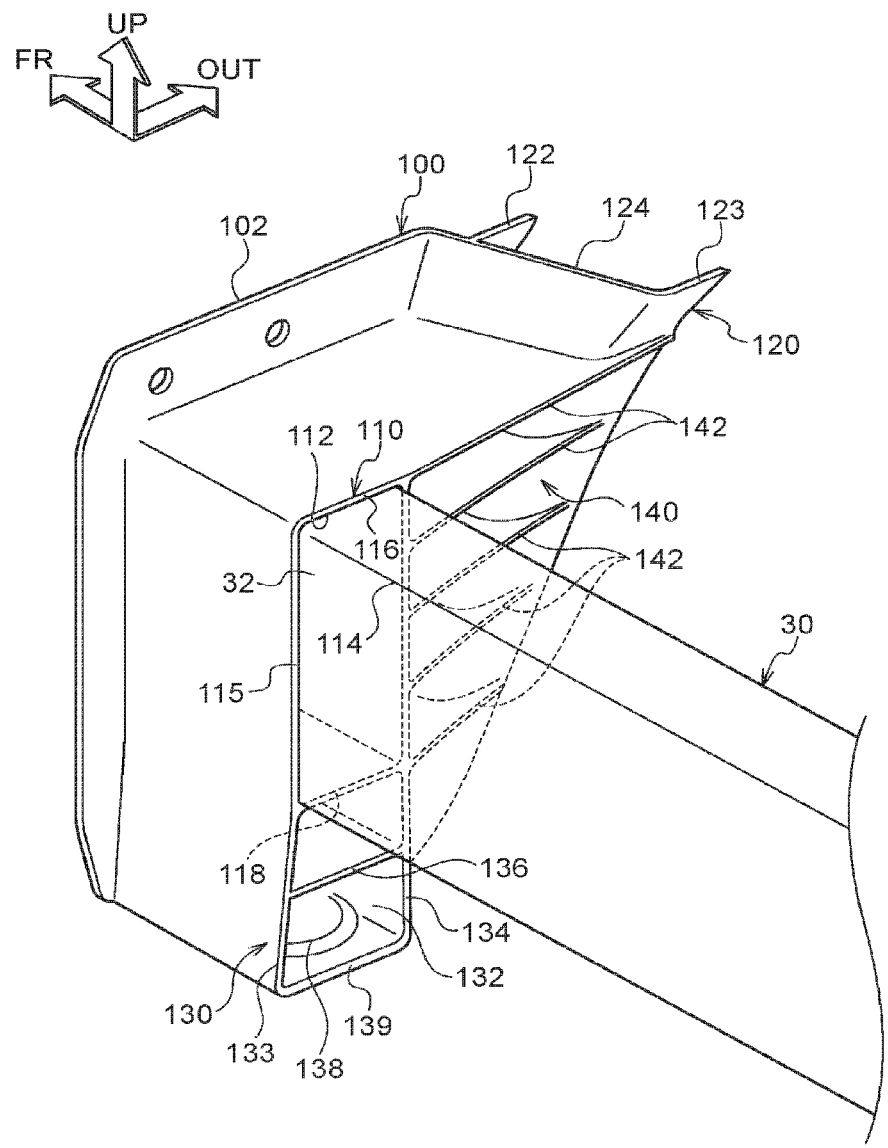
FIG. 4 is a perspective view illustrating a joint location between joint reinforcement and a side member according to an exemplary embodiment of the present disclosure.

As illustrated in FIG. 1 and FIG. 2, the side members 30, each with a closed cross-section structure, are provided running along the vehicle front-rear direction at the vehicle front-rear direction rear sides of the crash boxes 20, at both vehicle width direction side sections of the front section 12 of the vehicle 10. As illustrated in FIG. 1 and FIG. 4, a front end portion 32 of each side member 30 is inserted through the through-hole 112 of the first connecting section 110 of the joint reinforcement 100, and joined around the entire periphery thereof by arc welding. Note that as illustrated in FIG. 1 and FIG. 2, the axial center of the side member 30 and the axial center of the crash box 20 are configured so as to be aligned, or substantially aligned.

As illustrated in FIG. 1 to FIG. 6, a second connecting section 120 is formed at the vehicle width direction outside of the first connecting section 110 of the joint reinforcement 100. As illustrated in FIG. 2 to FIG. 5, the second connecting section 120 is configured by a front wall portion 122, a rear wall portion 123, and a side wall portion 124, and configures a substantially U-shape with the open side at the vehicle width direction outside in vehicle plan view.

Figure 5:
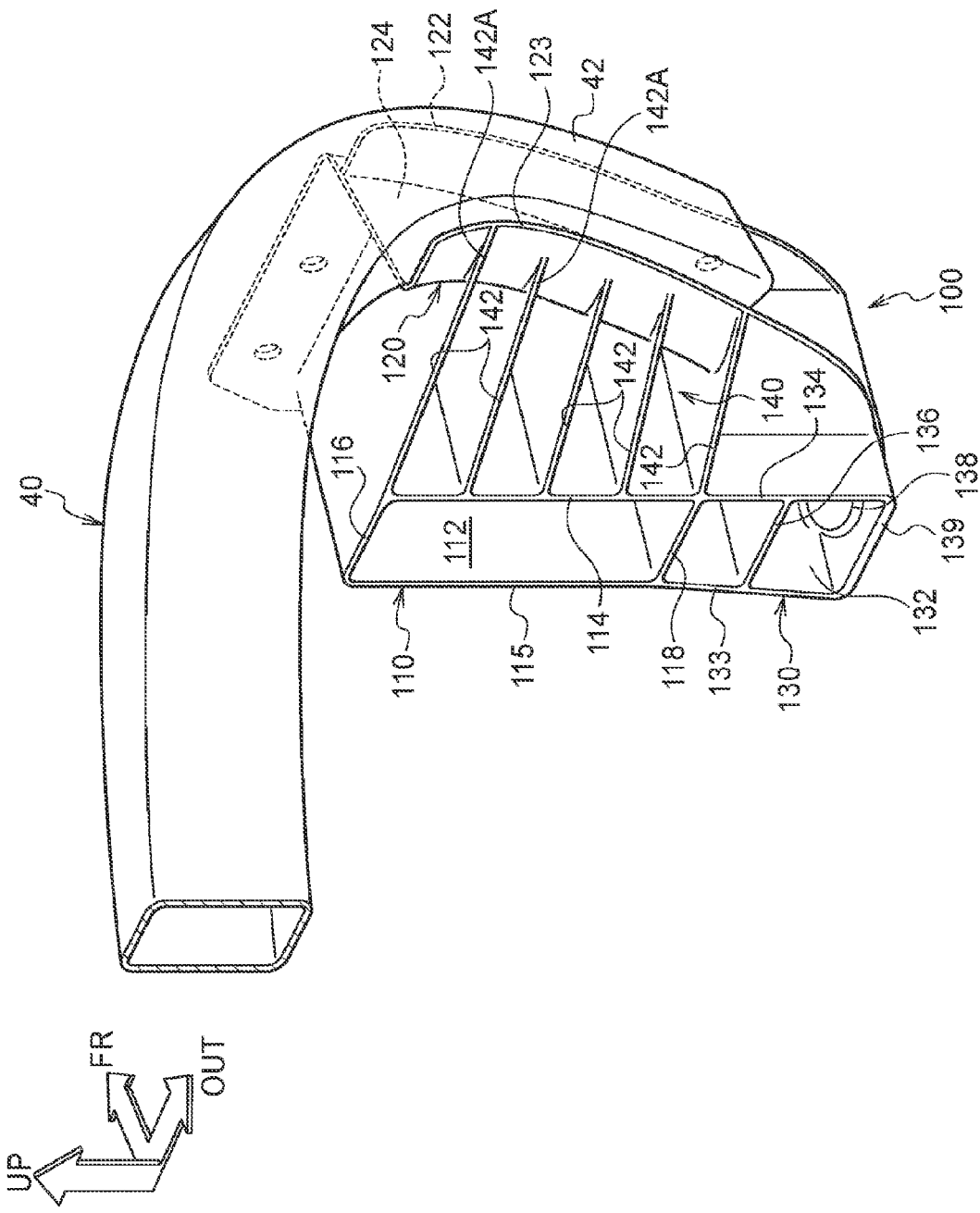
FIG. 5 is a perspective view illustrating a joint location between joint reinforcement and an outrigger according to an exemplary embodiment of the present disclosure.
Figure 6:
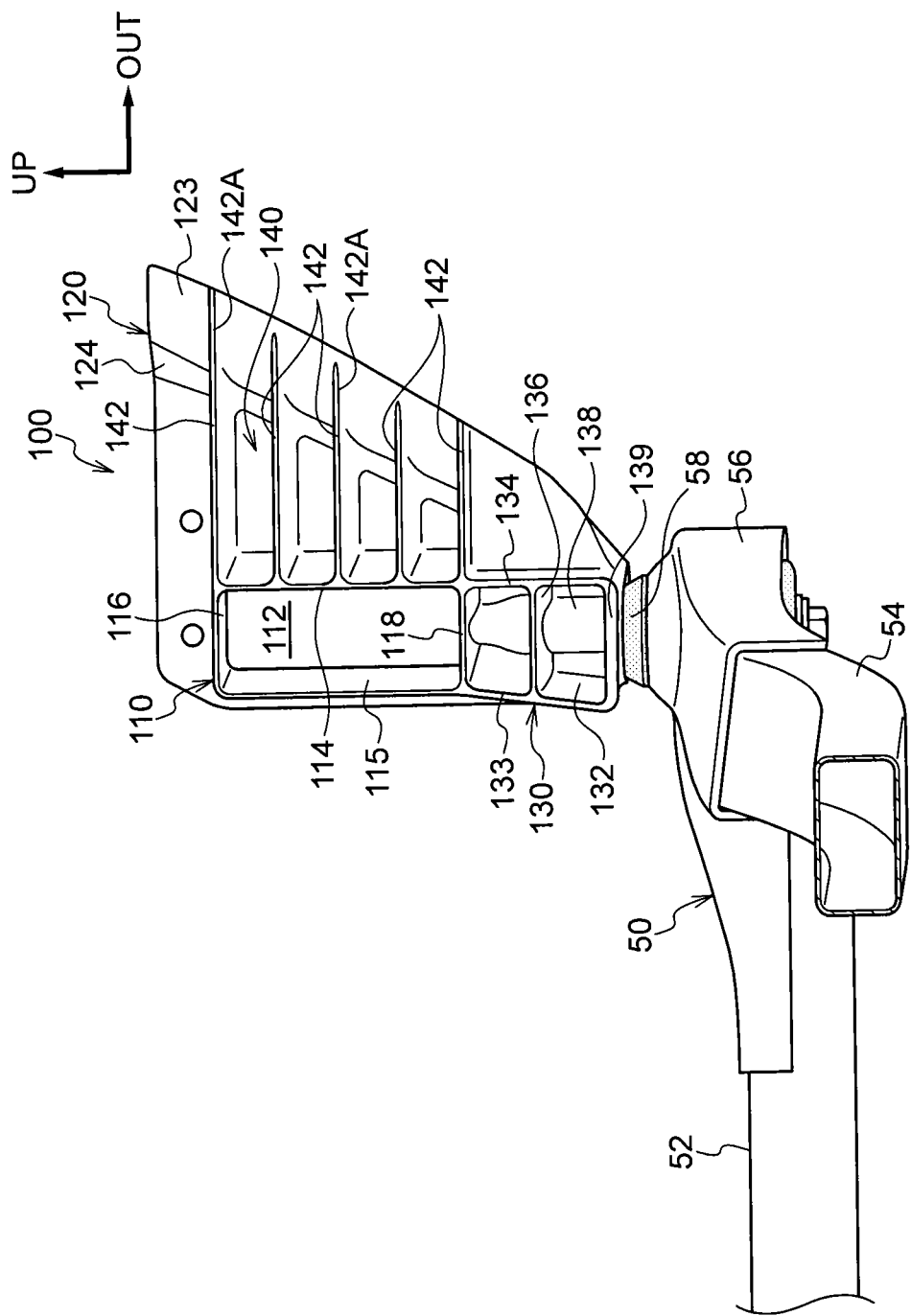
FIG. 6 is a rear view illustrating a joint location between joint reinforcement and a suspension member according to an exemplary embodiment of the present disclosure.

As illustrated in FIG. 5, the second connecting section 120 curves toward the vehicle front-rear direction rear side on progression toward the vehicle vertical direction lower side in vehicle side view. As illustrated in FIG. 4 to FIG. 6, the side wall portion 124 configuring a bottom face of the U-shape of the second connecting section 120 configures a sloped face sloping toward the vehicle width direction inside on progression toward the vehicle vertical direction lower side.

As illustrated in FIG. 1, FIG. 2, and FIG. 5, the outriggers (apron members) 40, each with a closed cross-section structure, are provided at the vehicle vertical direction upper sides of the vehicle width direction outsides of the side members 30 that are located at both vehicle width direction side sections of the front section 12 of the vehicle 10, and run along the vehicle front-rear direction.

A front side portion of each outrigger 40 curves toward the vehicle vertical direction lower side on progression toward the vehicle front-rear direction front side. A lower end portion 42 at the front side portion of the outrigger 40, extending toward the vehicle vertical direction lower side, is joined around the entire plate peripheral edge to the second connecting section 120 of the joint reinforcement 100 by arc welding. Note that, as previously described, the second connecting section 120 is configured in a substantially U-shape with its open side at the vehicle width direction outside, and configures a gripping structure that grips the lower end portion 42 of the outrigger 40 from the vehicle width direction inside.

As illustrated in FIG. 1, FIG. 4, FIG. 5, and FIG. 6, a recessed portion 140 that has an open side at the vehicle front-rear direction rear side and an inverted, substantially triangular shape in vehicle rear view is formed between the first connecting section 110 and the second connecting section 120 of the joint reinforcement 100. Plural lateral ribs 142, with their plate thickness direction along the vehicle vertical direction, are formed at the recessed portion 140 (in the present exemplary embodiment, upper and lower walls of the recessed portion 140 are also formed by the lateral ribs 142). The lateral ribs 142 are formed running along the vehicle width direction so as to couple the upright wall portion 114 at the vehicle width direction outside of the first connecting section 110, and the side wall portion 124 of the second connecting section 120. As illustrated in FIG. 5 and FIG. 6, leading end portions 142A of the lateral ribs 142 extend as far as the rear wall portion 123 (are formed at the rear wall portion 123) of the second connecting section 120.

As illustrated in FIG. 1 to FIG. 6, a third connecting section 130 is formed at a vehicle vertical direction lower side of the first connecting section 110 of the joint reinforcement 100.

As illustrated in FIG. 4 to FIG. 6, a recessed section 132 that has an open side at the vehicle front-rear direction rear side and a rectangular shape in rear view is formed at the third connecting section 130 (see FIG. 1 also). The recessed section 132 (third connecting section 130) is configured by upright wall portions 133, 134 as walls configuring both vehicle width direction sides, the intermediate wall portion 118 as a wall configuring the vehicle vertical direction upper side, and a lower wall portion 139 as a wall configuring the vehicle vertical direction lower side. To explain from another perspective, the intermediate wall portion 118 is a wall that partitions between the first connecting section 110 and the third connecting section 130. The upright wall portions 133, 134 function as upright ribs that couple together the lower wall portion 139 of the third connecting section 130 and the intermediate wall portion 118 of the first connecting section 110.

A lateral rib 136, with its plate thickness direction along the vehicle vertical direction, is formed at the recessed section 132. The lateral rib 136 is formed running along the vehicle width direction so as to couple the upright wall portion 133 and the upright wall portion 134.

As illustrated in FIG. 6, a boss 138 is formed inside the recessed section 132. The boss 138 is formed running along the vehicle vertical direction so as to couple the intermediate wall portion 118 and the lower wall portion 139. A screw hole open at the lower wall portion 139 is formed at the boss 138.

The third connecting section 130 thereby has a structure in which, in vehicle rear view, a rectangular shaped frame is configured by the upright wall portions 133, 134, the intermediate wall portion 118, and the lower wall portion 139, and the lateral rib 136 and the boss 138 are formed intersecting each other inside the rectangular shaped frame. The overall shape of the third connecting section 130 resembles a square shape with a cross inside in vehicle rear view.

As illustrated in FIG. 1 and FIG. 2, the suspension member 50 for supporting a front suspension or the like, not illustrated in the drawings, is provided at the vehicle vertical direction lower side of the vehicle width direction inside of the side members 30 of the front section 12 of the vehicle 10. The suspension member 50 configures a frame shaped structure that combines a cross member 52 and a side member 54 in a substantially rectangular shape in vehicle plan view.

As illustrated in FIG. 1, FIG. 2, and FIG. 6, a corner portion 56 at the front side of the suspension member 50 is bolt-fastened to the lower wall portion 139 of the third connecting section 130 of the joint reinforcement 100, with a bush 58 (see FIG. 6) interposed therebetween. Although not illustrated in the drawings, the bolt is screwed from below upward into the screw hole formed at the boss 138 and open at the lower wall portion 139.

Explanation follows regarding operation of the present exemplary embodiment.

The crash box 20, the side member 30, the outrigger (apron member) 40, and the suspension member 50 are joined to the one joint reinforcement 100 (see FIG. 1 and FIG. 2).

Collision load during a front-end collision of the vehicle 10 is thereby transmitted from the bumper reinforcement 14 to the crash box 20, and input from the crash box 20 to the front face portion 102 of the joint reinforcement 100. Collision load input to the front face portion 102 of the joint reinforcement 100 is distributed and transmitted to the side member 30, the outrigger 40, and the suspension member 50.

Note that collision load is transmitted to the vehicle width direction outside and efficiently transmitted to the outrigger 40 by the plural lateral ribs 142 that couple the upright wall portion 114 of the first connecting section 110, and the side wall portion 124 of the second connecting section 120, in the joint reinforcement 100.

The second connecting section 120 of the joint reinforcement 100 is a gripping structure that grips onto and is connected to the lower end portion 42 of the outrigger 40 from the vehicle width direction inside, thereby improving the connection strength.

Collision load is also transmitted to the vehicle vertical direction lower side, and efficiently transmitted to the suspension member 50, by the upright wall portions 133, 134 and the boss 138 that couple the lower wall portion 139 of the third connecting section 130, and the intermediate wall portion 118 of the first connecting section 110, in the joint reinforcement 100.

Collision load input from the front of the vehicle 10 is thereby efficiently distributed and transmitted to the side member 30, the outrigger 40, and the suspension member 50.

The third connecting section 130 of the joint reinforcement 100 has a structure in which, in vehicle rear view, a rectangular shaped frame is configured by the upright wall portions 133, 134, the intermediate wall portion 118, and the lower wall portion 139, and the lateral rib 136 and the boss 138 are formed so as to intersect each other inside the rectangular shaped frame. Rigidity at a force application point of the suspension member 50 is thereby effectively improved. Note that plural lateral ribs 136 may be formed in order to further improve rigidity at the force application point.

Since the crash box 20, the side member 30, the outrigger 40, and the suspension member 50 are connected together by the joint reinforcement 100 made of die-cast aluminum, the number of components is smaller and the weight is lighter than a configuration in which connection is made using plural components.

Since the joint reinforcement 100 of the present exemplary embodiment is made of die-cast aluminum, it can be made thinner and the plural ribs and wall shaped locations can be integrally formed more easily than in a press-formed component made of steel, for example.

Figure 7:
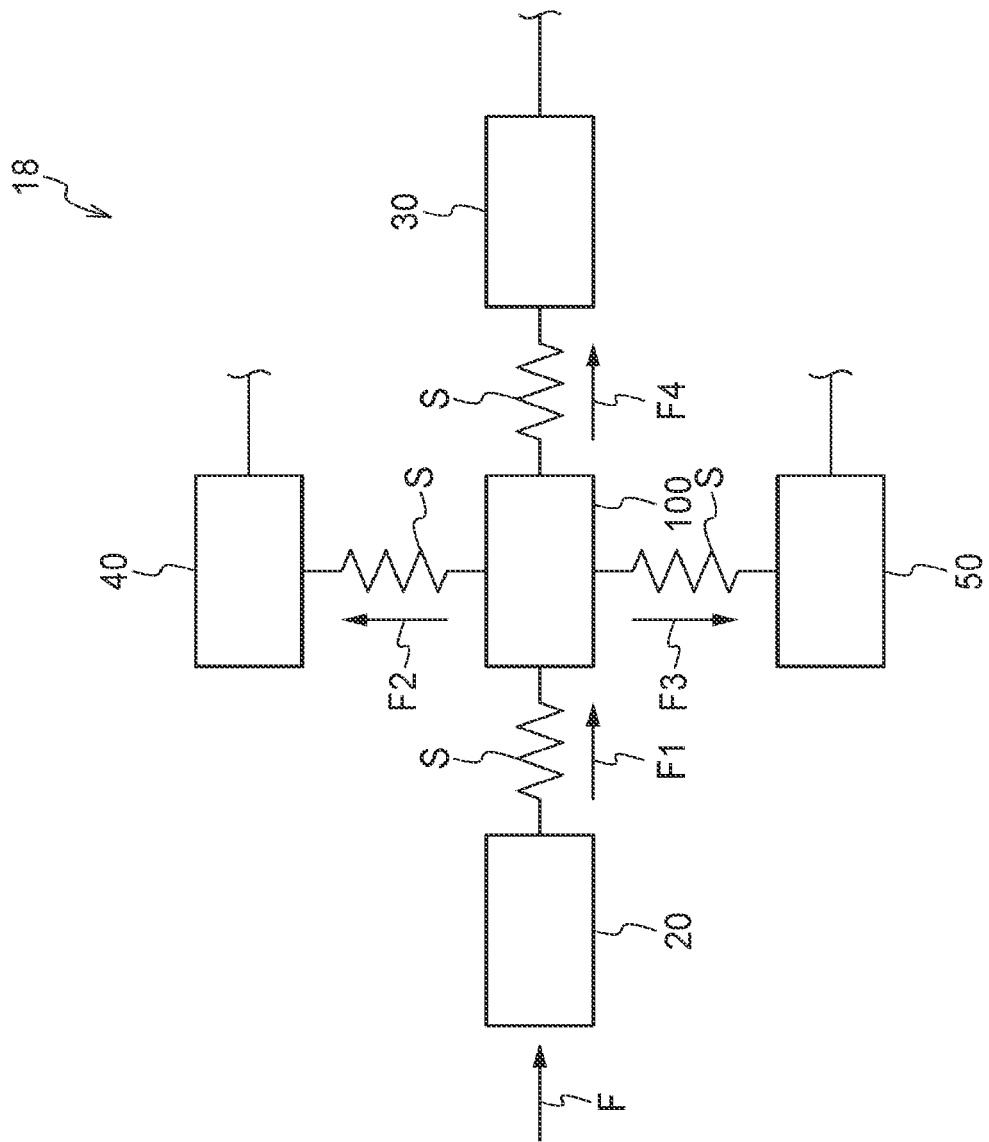
FIG. 7 is a model diagram illustrating a model of a vehicle front section structure according to an exemplary embodiment of the present disclosure.

FIG. 7 is a model diagram illustrating a model of the vehicle front section structure 18 in which the crash box 20, the side member 30, the outrigger 40, and the suspension member 50 are connected together by the one joint reinforcement 100 of the present exemplary embodiment. A spring element S is illustrated at each connecting location.

Figure 8:
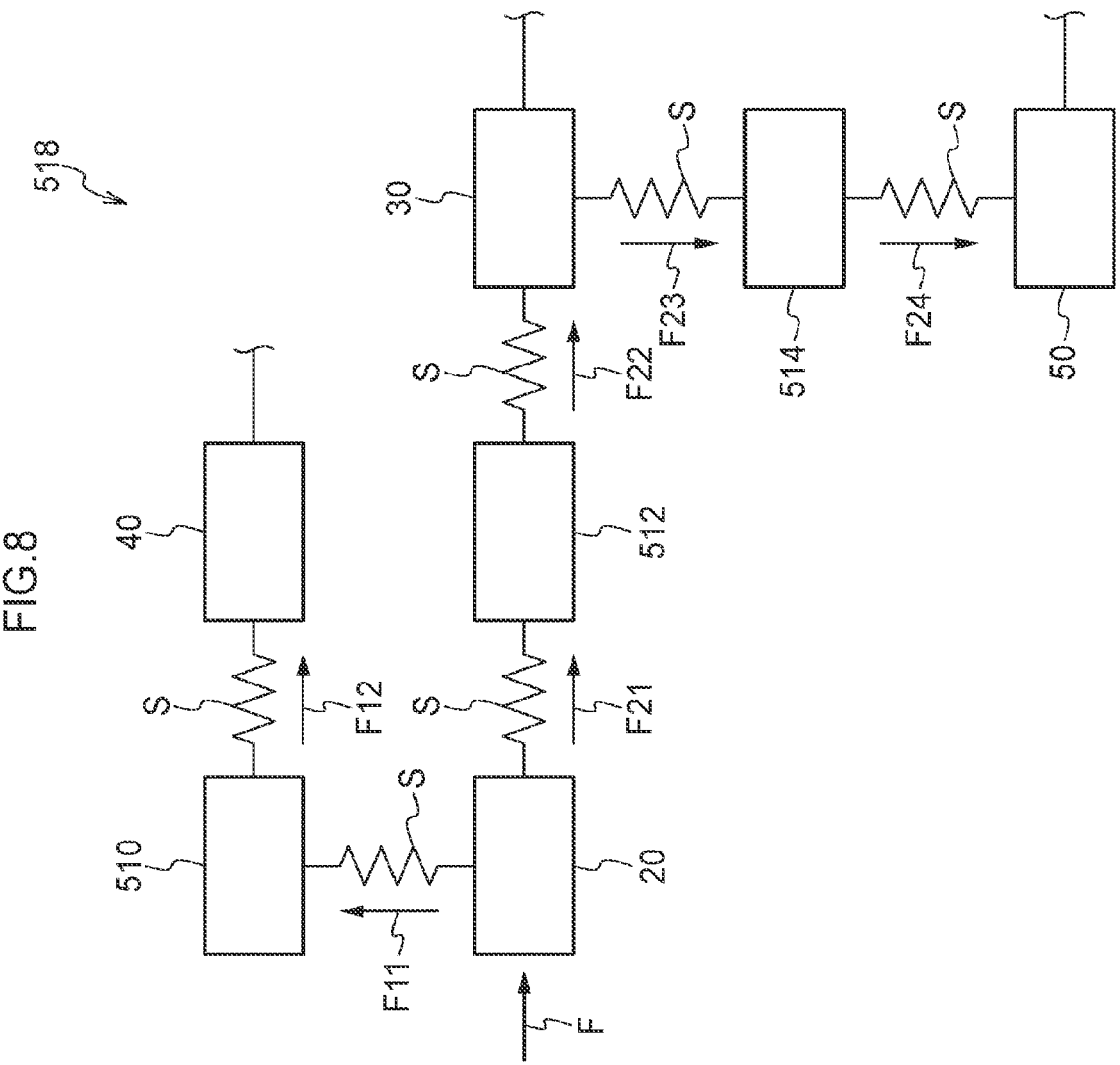
FIG. 8 is a model diagram illustrating a model of a vehicle front section structure of a reference example.

FIG. 8 is a model diagram illustrating a model of a vehicle front section structure 518 of a Comparative Example, in which a crash box 20, a side member 30, an outrigger 40, and a suspension member 50 are connected together using plural joint reinforcements 510, 512, 514. Specifically, the side member 30 is connected to the crash box 20 by the joint reinforcement 512, and the suspension member 50 is connected to the side member 30 by the joint reinforcement 514. The outrigger 40 is connected to the crash box 20 by the joint reinforcement 510.

In the vehicle front section structure 518 of the Comparative Example illustrated in FIG. 8, collision load F transmitted to the crash box 20 is distributed and input to the joint reinforcement 510 and the joint reinforcement 512 as collision load F11 and collision load F21, respectively.

The collision load F11 input to the joint reinforcement 510 is transmitted to the outrigger 40 as collision load F12.

The collision load F21 input to the joint reinforcement 512 is transmitted to the side member 30 as collision load F22. The collision load F22 is transmitted from the side member 30 to the joint reinforcement 514 as collision load F23, and the collision load F23 is then transmitted from the joint reinforcement 514 to the suspension member 50 as collision load F24.

The collision load F is thereby transmitted through the three joint reinforcements 510, 512, 514, and transmission efficiency is reduced due to stroke of the spring elements S in six locations. Moreover, connection is made by the three joint reinforcements 510, 512, 514, such that there are many connecting locations, thereby reducing rigidity and increasing the number of components.

In contrast thereto, in the vehicle front section structure 18 of the present exemplary embodiment illustrated in FIG. 7, collision load F transmitted to the crash box 20 is input to the joint reinforcement 100 as collision load F1. The collision load F1 input to the joint reinforcement 100 is distributed as collision loads F2, F3, F4 that are respectively transmitted to the outrigger 40, the suspension member 50, and the side member 30.

The collision load F is thereby distributed and transmitted by the one joint reinforcement 100, and the spring elements S are in four locations, which is fewer than the six locations of the Comparative Example in FIG. 8, such that transmission efficiency is improved. Moreover, connection is made by the one joint reinforcement 100, such that there are few connecting locations, thereby improving rigidity and reducing the number of components.

Note that the present disclosure is not limited to the above exemplary embodiment.

In the above exemplary embodiment, for example, the joint reinforcement 100 is made of die-cast aluminum; however, configuration is not limited thereto. The joint reinforcement 100 may be die-cast using a metal other than aluminum. Alternatively, instead of being die-cast, a resin joint reinforcement 100 may be made by integrally molding a resin material, as long as the rigidity and strength are secured.

In the above exemplary embodiment, the joint reinforcement 100 connects the crash box 20, the side member 30, the outrigger (apron member) 40, and the suspension member 50 together; however, configuration is not limited thereto. Joint reinforcement may be employed that connects the crash box 20, the side member 30, and the outrigger (apron member) 40 together.

Obviously, various embodiments may be implemented within a range not departing from the spirit of the present disclosure.

Explanation follows regarding vehicle connecting members and vehicle structures other than the joint reinforcement 100 of the above exemplary embodiment, which connect together, and are integrally formed at, end portions of plural frame members configuring a vehicle.

A first example is a vehicle front section structure in which a lower end portion of an A pillar upper extending toward the vehicle vertical direction lower side, an upper end portion of an A pillar lower extending toward the vehicle vertical direction upper side, an end portion of a cowl member extending toward the vehicle width direction outside, and a rear end portion of an upper member extending toward the vehicle front-rear direction rear side are connected together using a vehicle connecting member.

A second example is a vehicle front section structure in which a lower end portion of an A pillar lower extending toward the vehicle vertical direction lower side, an end portion of a dashboard cross member extending toward the vehicle width direction outside, and a front end portion of a rocker extending toward the vehicle front-rear direction front side are connected together using a vehicle connecting member.

Note that ribs are formed as appropriate in the vehicle connecting members that connect together, and are integrally formed at, end portions of plural frame members configuring the vehicle. For example, ribs may be formed as appropriate miming a direction in which load is transmitted, in order to efficiently transmit load to frame members that are connected in a direction intersecting the vehicle front-rear direction.

What is claimed is:

1. A vehicle connecting member comprising:
   a front face portion that is connected to a crash box;
   a first connecting section inserted with and connected to a front end portion of a side member provided running along a vehicle front-rear direction at the vehicle front-rear direction rear side of the crash box;
   a second connecting section that is formed at a vehicle width direction outside of the first connecting section in a vehicle plan view, and that is connected to a lower end portion of an outrigger provided running along the vehicle front-rear direction at the vehicle width direction outside of the side member so as to extend toward a vehicle vertical direction lower side; and
   one or more lateral ribs that couple together the first connecting section and the second connecting section, wherein the second connecting section configures a substantially U-shape with an open side at the vehicle width direction outside, and the second connecting section configures a gripping structure that grips onto the lower end portion of the outrigger from a vehicle width direction inside.

2. The vehicle connecting member of claim 1, further comprising a third connecting section that is formed at the vehicle vertical direction lower side of the first connecting section in a vehicle rear view and that has a lower portion bolt-fastened to a suspension member, wherein
   one or more upright ribs are formed at the third connecting section so as to couple the lower portion and the first connecting section.

3. The vehicle connecting member of claim 2, wherein one or more lateral ribs are formed at the third connecting section.

4. The vehicle connecting member of claim 2, wherein at least one of the upright ribs of the third connecting section configures a boss into which a bolt is screwed.

5. A vehicle front section structure comprising:
   the vehicle connecting member described in claim 1;
   the crash box that is provided at a vehicle front section and that is connected to the front face portion of the vehicle connecting member;
   the side member that is provided running along the vehicle front-rear direction at the vehicle front-rear direction rear side of the crash box, and that has a front end portion inserted into and connected to the first connecting section of the vehicle connecting member; and
   the outrigger that is provided running along the vehicle front-rear direction at the vehicle width direction outside of the side member, and that has a lower end portion extending toward the vehicle vertical direction lower side connected to the second connecting section of the vehicle connecting member.

6. A vehicle front section structure comprising:
   the vehicle connecting member of claim 2;
   the crash box that is provided at a vehicle front section and that is connected to the front face portion of the vehicle connecting member;
   the side member that is provided running along the vehicle front-rear direction at the vehicle front-rear direction rear side of the crash box, and that has a front end portion inserted into and connected to the first connecting section of the vehicle connecting member;
   the outrigger that is provided running along the vehicle front-rear direction at the vehicle width direction outside of the side member, and that has a lower end portion extending toward the vehicle vertical direction lower side connected to the second connecting section of the vehicle connecting member; and
   the suspension member that is bolt-fastened to the lower portion of the third connecting section of the vehicle connecting member.

7. The vehicle connecting member of claim 1, wherein the second connecting section includes a front wall portion, a rear wall portion, and a side wall portion, the side wall portion forming a bottom face of the U-shape.

8. The vehicle connecting member of claim 7, wherein the side wall portion slopes toward the vehicle width direction inside on progression toward the vehicle vertical direction lower side.

* * * * *